United States Patent [19]
Weadon et al.

[11] Patent Number: 5,924,749
[45] Date of Patent: *Jul. 20, 1999

[54] TORSIONALLY-BIASED LATCH ARRANGEMENT

[75] Inventors: Mark W. Weadon, Raleigh; Gregory S. Patterson, Morrisville, both of N.C.

[73] Assignee: Ericsson Inc., Research Triangle Park, N.C.

[*] Notice: This patent is subject to a terminal disclaimer.

[21] Appl. No.: 08/853,823

[22] Filed: May 9, 1997

Related U.S. Application Data

[63] Continuation of application No. 08/685,479, Jul. 24, 1996, Pat. No. 5,700,042.

[51] Int. Cl.⁶ .................................................. E05C 19/06
[52] U.S. Cl. ...................... 292/80; 292/87; 292/DIG. 38
[58] Field of Search ....................... 292/80, 87, DIG. 38, 292/91, 83, 81; 220/324, 326; 429/97, 98, 100

[56] References Cited

U.S. PATENT DOCUMENTS

| | | | |
|---|---|---|---|
| 629,523 | 7/1899 | Rarig | 292/88 |
| 1,491,880 | 4/1924 | Percy | 292/87 |
| 1,600,497 | 9/1926 | Wheller | 292/87 |
| 1,744,850 | 9/1930 | Snook | 292/89 |
| 2,089,371 | 8/1937 | Heller | 292/87 |
| 3,383,009 | 5/1968 | Weikert | 220/324 |
| 3,737,067 | 6/1973 | Palson | 220/324 |
| 3,741,433 | 6/1973 | Bentley et al. | 220/326 |
| 3,767,110 | 10/1973 | Congleton | 220/324 |
| 3,846,737 | 11/1974 | Spaulding | 220/326 |
| 4,212,415 | 7/1980 | Neely | 220/324 |
| 4,344,646 | 8/1982 | Michel | 292/87 |
| 4,478,005 | 10/1984 | Mundschenk | 292/87 |
| 4,501,378 | 2/1985 | Berfield | 220/326 |
| 4,582,219 | 4/1986 | Mortensen et al. | 292/80 |
| 4,730,731 | 3/1988 | Allison | 292/87 |
| 5,285,918 | 2/1994 | Weisburn et al. | 220/324 |
| 5,427,265 | 6/1995 | Cautereels et al. | 220/326 |
| 5,571,272 | 11/1996 | Roehr et al. | 292/80 |
| 5,700,042 | 12/1997 | Weadon et al. | 292/80 |

FOREIGN PATENT DOCUMENTS

| | | | |
|---|---|---|---|
| 69609 | 1/1983 | European Pat. Off. | 292/81 |

*Primary Examiner*—Darnell M. Boucher
*Attorney, Agent, or Firm*—Herbert V. Kerner

[57] ABSTRACT

A cover for a housing is maintained in a fixed position with respect to the housing by a latch arrangement that has at least one edge surface disposed along one edge of a flange which engages a mating surface on the housing when the cover is assembled with the housing. The other side of the flange is integrally formed with an elongated beam that is attached to the cover structure. The elongated beam is torsionally loaded upon assembly of the cover with the housing, and provides a bias force on the edge surface of the flange to maintain the forcible engagement of the edge surface with a mating surface of the housing. The latch arrangement combines the cost effectiveness and space efficiency characteristics of plastic latch designs with the durability, dependability and tactile qualities of mechanical spring arrangements.

21 Claims, 2 Drawing Sheets

TORSIONALLY-BIASED LATCH ARRANGEMENT

This application is a continuation of application Ser. No. 08/685,479, filed Jul. 24, 1996, now U.S. Pat. No. 5,700,042.

BACKGROUND OF THE INVENTION

1. Technical Field

This invention relates generally to a releasable latch for maintaining a cover in fixed relationship with a housing, and more particularly, to such a latch that is biased toward an engaged position by torsionally applied forces.

2. Background Art

Latch mechanisms are commonly used to secure a cover over a compartment, and several different latch mechanisms have been proposed for such purposes. Generally, latch mechanisms can be divided into two categories. The first group relies on a spring, or equivalent, compressible member, to provide the latching force in combination with a button arrangement. This type of latch generally exhibits excellent dependability, durability, and feel. However, they are also relatively costly and have space requirements which often exceed the room allowable. The second group relies on the ductility of the latch material itself to provide the latching force. The second group of latches are typically based on a cantilever beam arrangement, either as an end-loaded beam with one end fixed, or a center-loaded beam with both ends fixed. Such arrangements are generally more cost effective and space efficient than latches having separate compressible spring elements. However, the durability, dependability, and feel are not as good, and the useful service life of cantilevered beam arrangements is highly dependent on the design configuration, material properties, and operating environment.

Thus, current latch designs generally are either costly and require a considerable amount of space, or have limited durability, dependability, and operability. Though the end loaded, one-end fixed, cantilever configuration is used in a variety of applications, space limitations make this design particularly susceptible to fatigue failure. In addition, environmental conditions such as excessively high or low temperatures, the presence of skin oils and the like, further reduces fatigue life. Subsequently, the tactile feel of the latch is compromised as a result of trying to improve durability.

The above problems are particularly conspicuous when the latches are arranged on relatively small instruments, such as portable telephones, cellular phones and similar telecommunication equipment. Such instruments typically have battery compartments which are separable from the housing for recharge purposes. The battery compartments typically include an outer cover that is integrally shaped with the transceiver housing of the instrument.

The above invention is directed to overcoming the problems set forth above. It is desirable to have a latch arrangement that is durable, has excellent feel for enhanced operability, and is economical to produce. It is also desirable to have such a latch arrangement that is space efficient and has a remotely positioned member which does not normally come in contact with an operator's skin, and provides a bias force sufficient to maintain a cover at a desired position with respect to a housing. Such an arrangement reduces the amount of skin oils and other hand-carried substances that are deposited on the stressed member, and the resultant adverse affects of such materials on the fatigue characteristics of the member.

SUMMARY OF THE INVENTION

In accordance with one aspect of the present invention, a latch for maintaining a cover in fixed relationship with a housing includes an elongated beam having a predetermined length, a longitudinal axis extending along the predetermined length, and spaced apart end portions disposed on opposed ends of the beam at which the beam is connected to the housing. The latch also includes a flange that has a first side that is ecoterminous with the beam. A second side of the flange is spaced from the first side and has at least one edge surface disposed at the second side. The edge surface is adapted to engage a respective mating surface provided on the housing when the cover is assembled with the housing.

Other features of the latch embodying the present invention include the flange being predisposed in a fixed radial relationship with respect to the longitudinal axis of the beam such that when the cover is assembled with the housing, the edge surface of the flange is displaced by the respective mating surface of the housing by a distance sufficient to cause the beam to twist about the longitudinal axis in a first direction and produce a torsional force in the beam that acts in a direction opposite to the first direction. The produced torsional force is sufficient to forcibly maintain the edge surface of the flange in engagement with the mating surface of the housing when the cover is assembled with the housing.

Additionally, other features of the latch embodying the present invention include the beam having a centrally disposed mid portion at which the beam is additionally connected to the cover. In one embodiment, the mid portion and end portion connections of the beam to the cover collectively extend along less than about 30 percent of the length of the beam. Also, another feature includes the flange having an elongated slot disposed between the first and second sides of the flange in a direction parallel with the longitudinal axis of the beam. The slot has a midpoint that is aligned with the mid portion of the beam. Yet another feature of the latch embodying the present invention includes a means for moving the edge surface disposed on the second side of the flange in a direction away from engagement with the mating surface of the housing when the cover is assembled with the housing.

Additional features of the releasable latch embodying the present invention include the means for moving the edge surfaces on the flange away from engagement with the mating surfaces of the housing, being a tab integrally formed with the flange and extending outwardly from the second side of the flange at a position between spaced apart edge surfaces. The tab is manually movable to a position at which the flange is depressed and the spaced-apart edge surfaces are released from forcible engagement with the mating surfaces of the housing. Other features include the elongated slot disposed in the flange having a length that is sufficient to modify the force transmission characteristics of the flange such that the resistance to the torsional force developed in said beam is substantially equally distributed between the mid portion and end portions of the beam.

DETAILED DESCRIPTION OF A PRESENTLY PREFERRED EXEMPLARY EMBODIMENT

Figure 1:
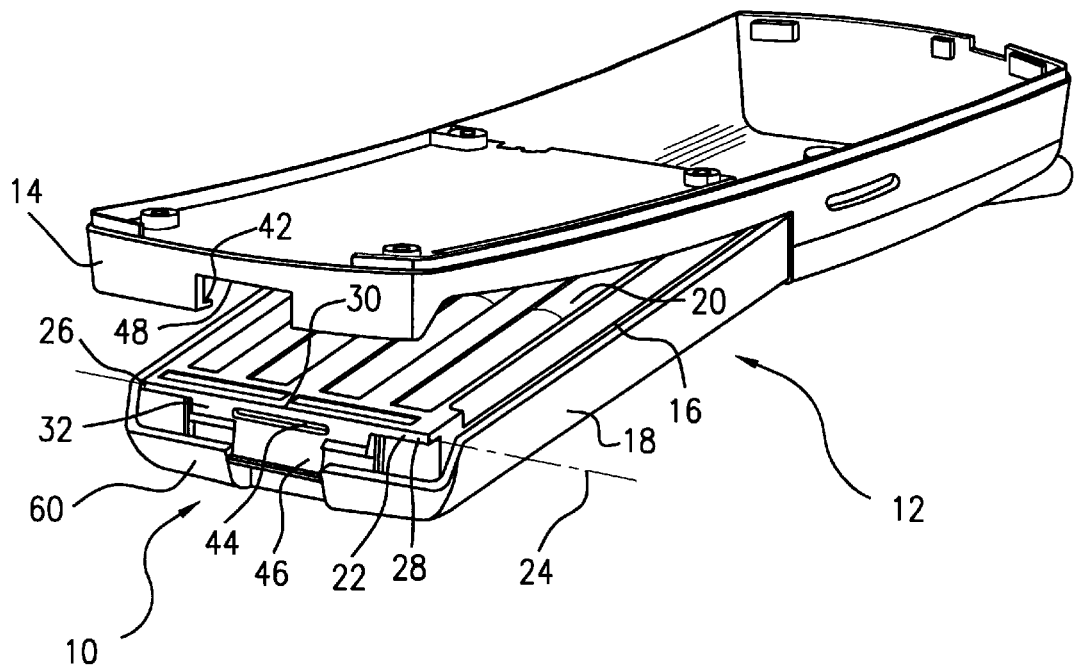
FIG. 1 is a three-dimensional view of a portion of the housing of a telecommunications instrument having a removable battery compartment, in which the torsionally-biased latch arrangement embodying the present invention is arranged on the battery compartment cover assembly.

In an illustrative embodiment, a torsionally-biased latch 10 is used to releasably secure a cover assembly 12 which forms a rechargeable battery compartment for a cellular telephone, the rear housing 14 of which is shown in FIG. 1. The cover assembly 12 actually comprises two members that snap together, a battery retainer member 16, and an outer covering 18 that is shaped to conform with the outer surface of the cellular phone. Thus, the cover assembly 12 provides a separable holder that is not readily disassemblable and advantageously provides containment for a plurality of rechargeable batteries 20 that are used over an extended period of time. The cover assembly 12 also contains contacts, not shown, that mate with contacts on a suitable charger and thus avoids the necessity of removing the batteries from the cover assembly 12 for charging purposes.

Figure 2:
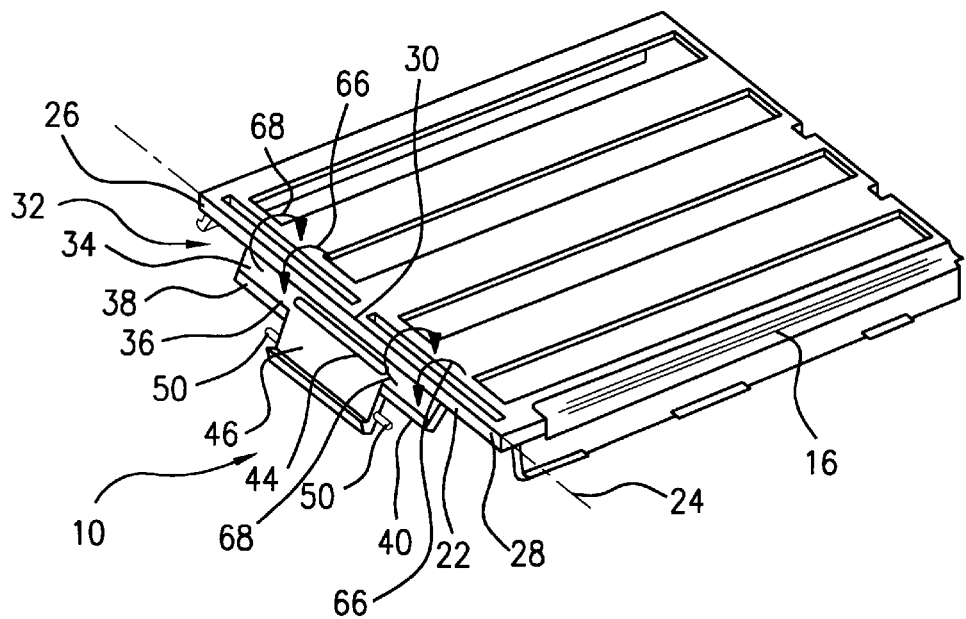
FIG. 2 is a three-dimensional view of the battery retainer component of the cover assembly, showing the torsionally-biased latch arrangement embodying the present invention incorporated therein.
Figure 3:
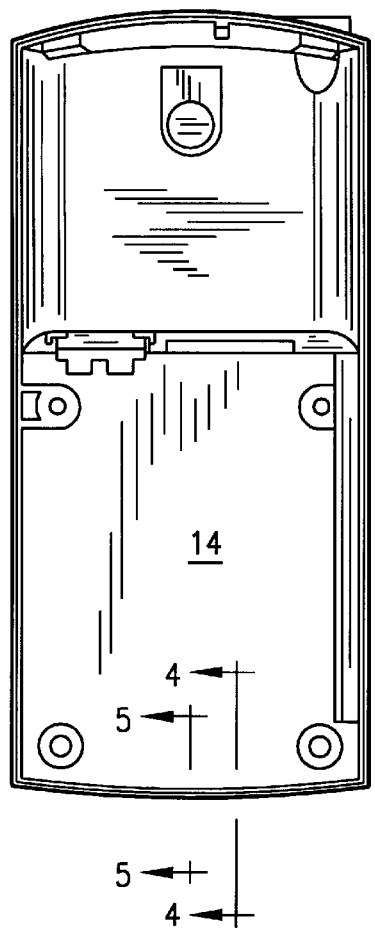
FIG. 3 is a plan view of the telecommunication instrument housing shown in FIG. 1.

In the preferred embodiment, the latch 10 is integrally molded with the battery retainer member 16 of the cover assembly 12 and is disposed at one end of the member 16, as best shown in FIGS. 1 and 2. The latch 10 cooperates with a pair of conventional outwardly extending tabs, not shown, disposed on an opposite end of the cover assembly 12 which engage a respective pair of notches provided in the housing 14, likewise not shown, to maintain the cover assembly 12 in a fixed position with respect to the housing 14. The cover assembly 12 is removed from the housing 14 by depressing the latch 10, as described below, and then rotating the latch end of the cover assembly 12 away from the transceiver housing 14, as shown in FIG. 1. The cover assembly 12 may then be moved as a unit and inserted into a battery charger to recharge the batteries 20.

As best shown in FIG. 2, the latch 10 has an elongated beam section 22 that has a length substantially equal to the width of the cover assembly 12, and a longitudinal axis 24 extending along the length of the beam 22. The elongated beam 22 also has a pair of spaced-apart end portions 26, 28 disposed at opposite ends of the beam 22, and a centrally disposed mid-portion 30. The end portions 26, 28 and the mid portion 30 each have predefined lengths that, desirably, collectively extend along less than about 30% of the length of the beam 22 and provide the sole connection points between the beam 22 and the battery retainer portion 16 of cover assembly 12.

In other arrangements, the beam 22 may have sufficient stiffness, i.e., resistance to bending, due to a shorter length, greater cross-sectional area, or more rigid material properties, wherein the mid-point connection is not required to provide beam stiffness. In such arrangements, the mid-point connection 30 is not required and may be omitted.

In an illustrative example, the cover assembly 12, including the battery retainer 16 and the latch 10 are molded of a polycarbonate/ABS thermoplastic material such as Cycoloy 1200 HF produced by GE. In the illustrative example, the elongated beam 22 has a cross-sectional area of about 2.5 mm$^2$, and a length of about 43 mm. The length of each of the connection points, i.e., the end portions 26, 28 and the mid portion 30, is about 1.7 mm, which collectively add up to a distance of about 5 mm along the length of the beam 22 at which the beam is connected to the supporting structure. Thus, in the illustrated embodiment, the total length of the connection points is less than 12% of the total length of the beam, i.e., over 88% of the beam is unsupported by the cover assembly 12.

Figure 4:
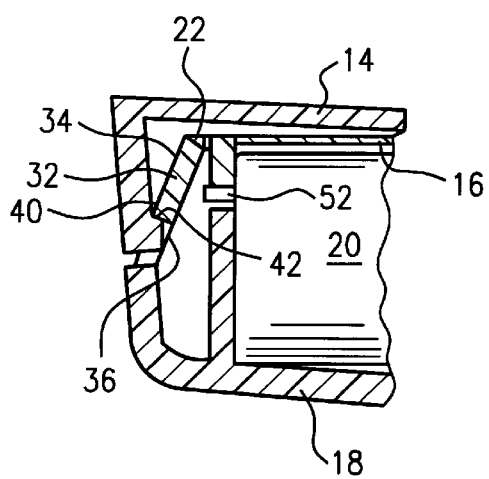
FIG. 4 is a cross-sectional view taken along the line 4—4 of FIG. 3, showing a portion of the latch arrangement embodying the present invention.

The latch 10 also includes a flange 32 that is preferably integrally formed with the elongated beam 22 and has a first side 34 that is coterminous with the beam 22. The flange 32 is centrally disposed between the end portions 26, 28 of the beam 22 and, as can be seen in the drawings, has a length that is less than the length of the beam 22. In the illustrative example, the flange 32 has a length of about 26 mm, or about 40% less than the length of the elongated beam 22. The flange 32 also has a second side 36 that is spaced from the first side 34 and has a pair of edge surfaces 38, 40, that are spaced apart along the second side 36. The edge surfaces 38, 40, are adapted to engage a respective mating surface 42 provided on the housing 14, as shown in FIG. 4, when the cover assembly 12 is assembled with the housing 14. In the illustrative example, the flange 32 has a thickness of about 1.5 mm and a width, as measured between the first side and the second side 36, of about 4.5 mm.

In the preferred embodiment, the flange 32 has an elongated slot 44 that is disposed between the first and second sides 34, 36 of the flange 32 in a direction parallel with the longitudinal axis 24 of the beam 22, with the mid point of the slot 44 aligned with the mid portion 30 of the beam 22. The flange is predisposed in fixed radial relationship with respect to the longitudinal axis 24 of the beam 22 such that when the cover assembly 12 is assembled with the housing 14, the edge surfaces 38, 40 positioned on the second side 36 of the flange 32, are displaced by the respective mating surfaces 42 of the housing 14 by a distance that is sufficient to cause the beam 22 to twist about the longitudinal axis 24 in a first direction 66 and thereby produce a torsional force in the beam 22 that acts in the direction indicated by the directional arrow 68 in FIG. 2, i.e., in a direction opposite to the first direction 66. The produced torsional force is sufficient to forcibly maintain the edge surfaces 38, 40 of the flange 32 in fixed engagement with the mating surfaces 42 of the housing 14 when the cover 12 is assembled with the housing 14.

The length of the elongated slot 44 is sufficient to modify the force transmission characteristics of the flange 32 such that the loads transferred to the beam 22 as a result of displacing the edge surfaces 38, 40 are substantially uniformly distributed along the beam 22. Accordingly, the resistance to the torsional force thus developed in the beam is substantially equally distributed between the mid portion connection 30 and the end portion connections 28, 30 of the beam 22 with the battery retainer 16 of the cover assembly 12. In the illustrative example, the distance by which the edge surfaces 38, 40 of the flange 32 are displaced upon assembly in the housing 14, is from about 1 mm to about 2 mm. Also, the elongated slot 44 has a width of about 1.0 mm, and a length of about 13 mm, i.e., about 50% of the length of the flange 32.

Desirably, the latch 10 also includes a means for moving the edge surfaces 38, 40 disposed on the second side 36 of a flange 32 in a direction away from engagement with the mating surfaces 42 of the housing 14 when the cover 12 is assembled with the housing 14. In the illustrative embodiment, the means for moving the edge surfaces 38, 40 in the above-stated direction, comprises a tab 46 that is integrally formed with the flange 32 and extends outwardly from the second side 36 of the flange 32 at a position between the spaced-apart edge surfaces 38, 40. When assembled, the tab 46 extends through an opening 48 provided in the housing 14 and is readily manually movable, such as by an operator's thumb or finger pressure, to a position at which the flange 32 is depressed, and the spaced apart edge surfaces 38, 40 are released from forcible engagement with the mating surfaces 42 of the housing 14. After release of the edge surfaces 38, 40 from the mating surface 42 of the housing, the cover assembly 12 can be rotated and lifted away from the housing 14, as illustrated in FIG. 1.

In the illustrated preferred embodiment, a pair of laterally extending pins 50 project outwardly from each side of the tab 46 and limits the projection of the tab 46 through the opening 48. When assembled with the cover 18, the tab 46 is deflected outwardly a predetermined distance whereat the pins 50 engage an inner surface of a lip portion 60 of the outer covering 18 to prevent additional outward extension of the tab 46. Also, the inward deflection of the tab 46, when depressed to release the edge surface 38,40 from the housing, is limited by a stop 52 formed on the battery retainer 16. The stop 52 prevents unnecessary inward deflection of the tab 46. The pins 50 and the stops 52 thus cooperate to prevent the tab 46 from being excessively deflected inwardly or outwardly, thereby reducing the likelihood that the tab 46 could be accidentally broken off during inserting or removal of the cover assembly 12 from the housing 14.

Thus, it can be seen that the flange 32, containing the latching edge surfaces 38, 40, is attached to the torsional beam 22 in such a manner that the beam 22 twists about its axis when the edge surfaces are engaged in the assembled position, and provide a constant torsional force on the flange 32 to maintain the edge surfaces, 38, 40 in a locked condition. The elongated slot 44 is an important feature which causes the latch 10 to operate as a torsional beam. Without the elongated slot 44, the latch would become primarily an end loaded one-end fixed beam acting from the mid portion connection point 30. Elimination of the mid point connection attachment point 30 would permit the torsional beam 22 to deflect in its center region and defeat the benefits afforded by the torsional beam construction described herein.

Figure 5:
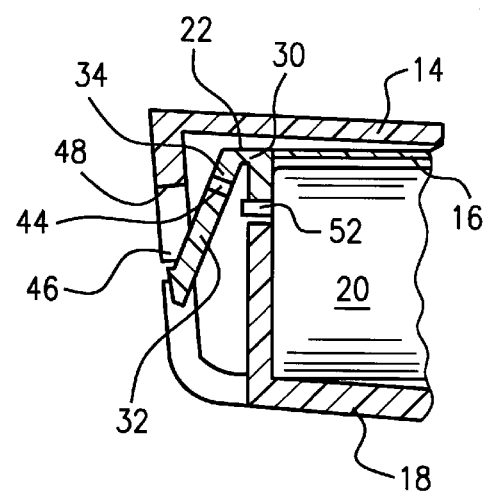
FIG. 5 is a cross-sectional view taken along the line 5—5 of FIG. 3, showing another portion of the releasable latch arrangement embodying the present invention.

The latch 10, as described above and defined in the following claims, combines the cost-effective and space-efficient characteristics of a plastic latch design with the durability, dependability, and tactile qualities of a mechanical spring latch. Furthermore, since the torsionally loaded elongated beam 22 is spaced away from the release tab, i.e., the contact point with the user's skin, it eliminates the risk of skin oils adversely affecting the fatigue characteristics of the plastic material. As can be seen in FIGS. 4 and 5, in the exemplary preferred embodiment described herein the elongated torsion beam 22 is actually protectively covered by the transceiver housing 14 when assembled. Thus, the latch 10 is particularly suitable for use in instruments and toys which have compartment covers that require removal for frequent access to internally disposed components, such as batteries.

Although the present invention is described in terms of a preferred exemplary embodiment with specific illustrative dimensions, those skilled in the art will recognize that changes in those dimensions and in the specifically identified material may be made without departing from the spirit of the invention. Such changes are intended to fall within the scope of the following claims. Other aspects, features and advantages of the present invention can be obtained from a study of this disclosure and the drawings, along with the appended claims.

What is claimed is:

1. A latch mechanism for latching a cover to a housing having a mating surface, comprising:

a beam adapted to be connected to the cover at first and second connection points and a mid connection point between said first and second connection points, said beam having a longitudinal axis, said mid connection point and said first and second connection points defining at least one aperture between said beam and said cover; and a flange affixed to said beam between said first and second connection points, such that when said flange is deflected in a direction perpendicular to the longitudinal axis of said beam, at least a portion of said beam rotates about the longitudinal axis in a first angular direction.

2. A latch mechanism as recited in claim 1, wherein when said portion of said beam rotates about the longitudinal axis in said first angular direction, a torsional force is developed in said beam in an angular direction opposite said first angular direction.

3. A latch mechanism as recited in claim 2, wherein said flange is adapted to be deflected in a direction perpendicular to said beam by the mating surface of the housing as the cover is placed into engagement with the housing.

4. A latch mechanism for latching a cover to a housing having a mating surface, comprising:

a beam adapted to be connected to the cover at first and second connection points and a mid connection point between said first and second connection points, said beam having a longitudinal axis, said mid connection point and said first and second connection points defining at least one aperture between said beam and said cover; and a flange affixed to said beam at a first location between said first connection point and said mid connection point and at a second location between said second connection point and said mid connection point, such that when said flange is deflected in a direction perpendicular to the longitudinal axis of said beam, at least a first portion of said beam between said first connection point and said mid connection point and at least a second portion of said beam between said second connection point and said mid connection point rotate about the longitudinal axis in a first angular direction.

5. A latch mechanism as recited in claim 4, wherein when said first and second portions of said beam rotate about the longitudinal axis in said first angular direction, a torsional force is developed in said beam in an angular direction opposite said first angular direction.

6. A latch mechanism as recited in claim 4, wherein said flange is adapted to be deflected in a direction perpendicular to the longitudinal axis of said beam by the mating surface of the housing as the cover is placed into engagement with the housing.

7. A latch mechanism for latching a cover to a housing having a mating surface, comprising:

a beam adapted to be connected to the cover at first and second connection points and a mid connection point between said first and second connection points, said beam having a longitudinal axis, said mid connection point and said first and second connection points defining at least one aperture between said beam and said cover; and a flange affixed to said beam;

said flange having an aperture disposed therethrough adjacent said mid connection point, such that when said flange is deflected in a direction perpendicular to the longitudinal axis of said beam, at least a first portion of said beam between said first connection point and said mid connection point and at least a second portion of said beam between said second connection point and said mid connection point rotate about the longitudinal axis in a first angular direction.

8. A latch mechanism as recited in claim 7, wherein said flange is integrally formed with said beam.

9. A latch mechanism as recited in claim 7, wherein said flange includes at least one edge surface for engaging the mating surface of the housing, wherein said flange is adapted to be deflected in a direction perpendicular to the longitudinal axis of said beam by the mating surface of the housing as the cover is placed into engagement with the housing.

10. A latch mechanism as recited in claim 7, wherein said flange includes a tab for manually deflecting said flange.

11. A latch mechanism as recited in claim 10, wherein said tab includes at least one pin extending therefrom, said pin arranged to engage an inner surface of the cover when said latch is deflected in an outward direction to prevent said latch from being deflected outward more than a predetermined distance.

12. A cover assembly removably connectable to a housing having a mating surface, comprising:

a first cover member;

a beam connected to said first cover member at first and second connection points and a mid connection point between said first and second connection points, said beam having a longitudinal axis, said mid connection point and said first and second connection points defining at least one aperture between said beam and said cover; and a flange affixed to said beam between said first and second connection points, such that when said flange is deflected in a direction perpendicular to the longitudinal axis of said beam, at least a portion of said beam rotates about the longitudinal axis in a first angular direction.

13. A cover assembly as recited in claim 12, wherein when said portion of said beam rotates about the longitudinal axis in said first angular direction, a torsional force is developed in said beam in an angular direction opposite said first angular direction.

14. A cover assembly as recited in claim 13, wherein said flange is adapted to be deflected in a direction perpendicular to the longitudinal axis of said beam by the mating surface of the housing as the cover is placed into engagement with the housing.

15. A cover assembly removably connectable to a housing having a mating surface, comprising:

a first cover member;

a beam connected to said first cover member at first and second connection points and a mid connection point between said first and second connection points, said beam having a longitudinal axis, said mid connection point and said first and second connection points defining at least one aperture between said beam and said cover; and a flange affixed to said beam;

said flange having an aperture disposed therethrough adjacent said mid connection point, such that when said flange is deflected in a direction perpendicular to the longitudinal axis of said beam, at least a first portion of said beam between said first connection point and said mid connection point and at least a second portion of said beam between said second connection point and said mid connection point rotate about the longitudinal axis in a first angular direction.

16. A cover assembly as recited in claim 15, wherein said flange is integrally formed with said beam.

17. A cover assembly as recited in claim 15, wherein said flange includes at least one edge surface for engaging the mating surface of the housing, wherein said flange is adapted to be deflected in a direction perpendicular to the longitudinal axis of said beam by the mating surface of the housing as the cover is placed into engagement with the housing.

18. A cover assembly as recited in claim 15, wherein said flange includes a tab for manually deflecting said flange.

19. A cover assembly as recited in claim 18, further comprising:

a second cover member attached to said first cover member, wherein said tab includes at least one pin extending therefrom, said pin arranged to engage an inner surface of said second cover member when said flange is deflected in an outward direction to prevent said flange from being deflected outward more than a predetermined distance.

20. A cover assembly as recited in claim 15, further comprising:

a second cover member attached to said first cover member, said second cover member including at least one stop disposed adjacent said flange, wherein said stop is arranged to engage an inner surface of said flange when said flange is deflected in an inward direction to prevent said latch from being deflected inward more than a predetermined distance.

21. A cover assembly as recited in claim 19, wherein said second cover member includes at least one stop disposed adjacent said flange, and wherein said stop is arranged to engage an inner surface of said flange when said flange is deflected in an inward direction to prevent said latch from being deflected inward more than a predetermined distance.

* * * * *